United States Patent [19]
Vinton

[11] 3,939,936
[45] Feb. 24, 1976

[54] DUAL CONVERTER TRANSMISSION ARRANGEMENT

[75] Inventor: David S. Vinton, Morton, Ill.

[73] Assignee: Caterpillar Tractor Co., Peoria, Ill.

[22] Filed: May 17, 1974

[21] Appl. No.: 470,845

[52] U.S. Cl............... 180/70 R; 74/688; 180/44 R; 180/51; 180/52
[51] Int. Cl.².................. B60K 17/06; B60K 17/34
[58] Field of Search...... 180/49, 51, 52, 44 R, 70 R; 74/688

[56] References Cited
UNITED STATES PATENTS

| | | | |
|---|---|---|---|
| 2,377,696 | 6/1945 | Kelley | 74/688 |
| 2,981,126 | 4/1961 | Kelley | 180/44 R |
| 3,334,703 | 8/1967 | Zeller | 180/44 R |
| 3,455,407 | 7/1969 | Phillips | 180/44 X |
| 3,580,350 | 5/1971 | Arkus-Dunton | 180/44 R |
| 3,583,243 | 6/1971 | Wilson | 74/688 X |

FOREIGN PATENTS OR APPLICATIONS

| | | | |
|---|---|---|---|
| 735,806 | 8/1955 | United Kingdom | 180/70 R |

Primary Examiner—M. Henson Wood, Jr.
Assistant Examiner—John P. Silverstrim
Attorney, Agent, or Firm—Phillips, Moore, Weissenberger Lempio & Strabala

[57] ABSTRACT

A vehicle, which includes a motor having rotary output means, further includes a pair of torque converters, both driven by the rotary output means of the motor. Each torque converter drives a multi-speed transmission, and both transmissions drive a rotatable shaft, the rotation of which drives the front and rear wheels of the vehicle.

1 Claim, 3 Drawing Figures

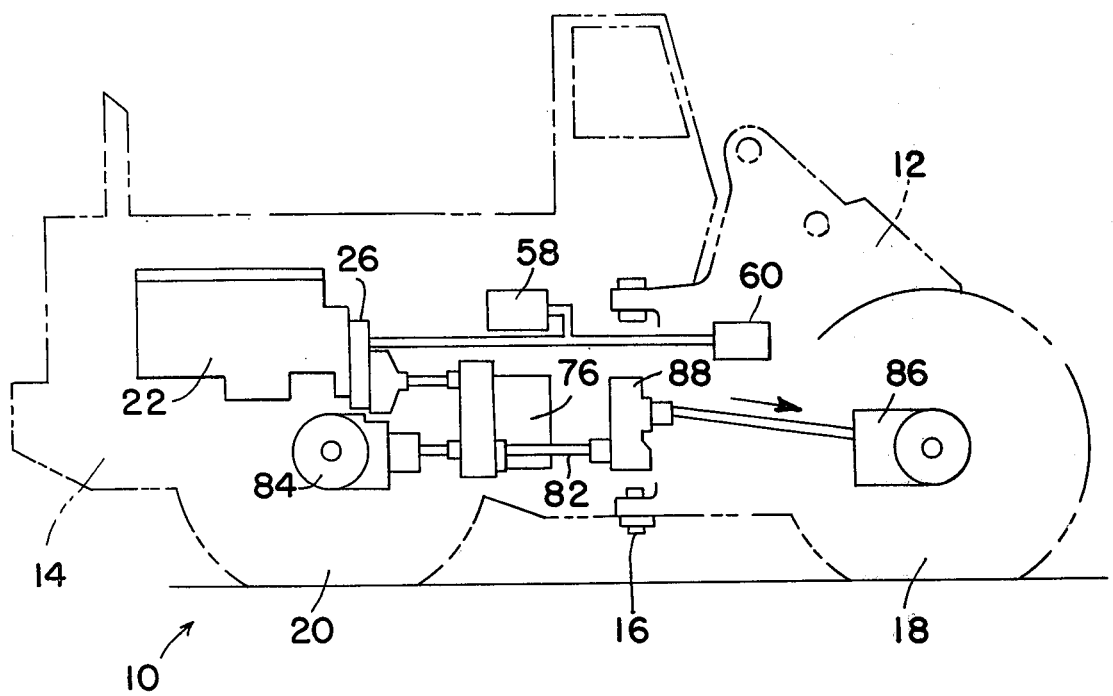
Fig-1-
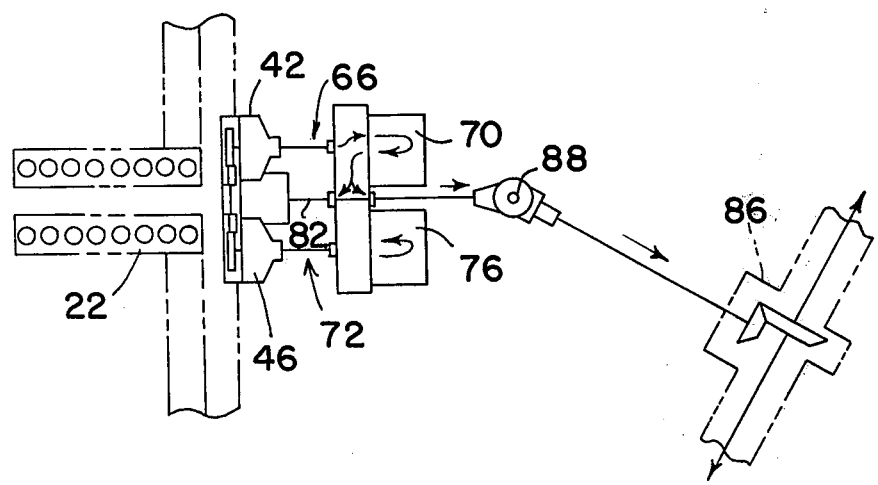
Fig-2-

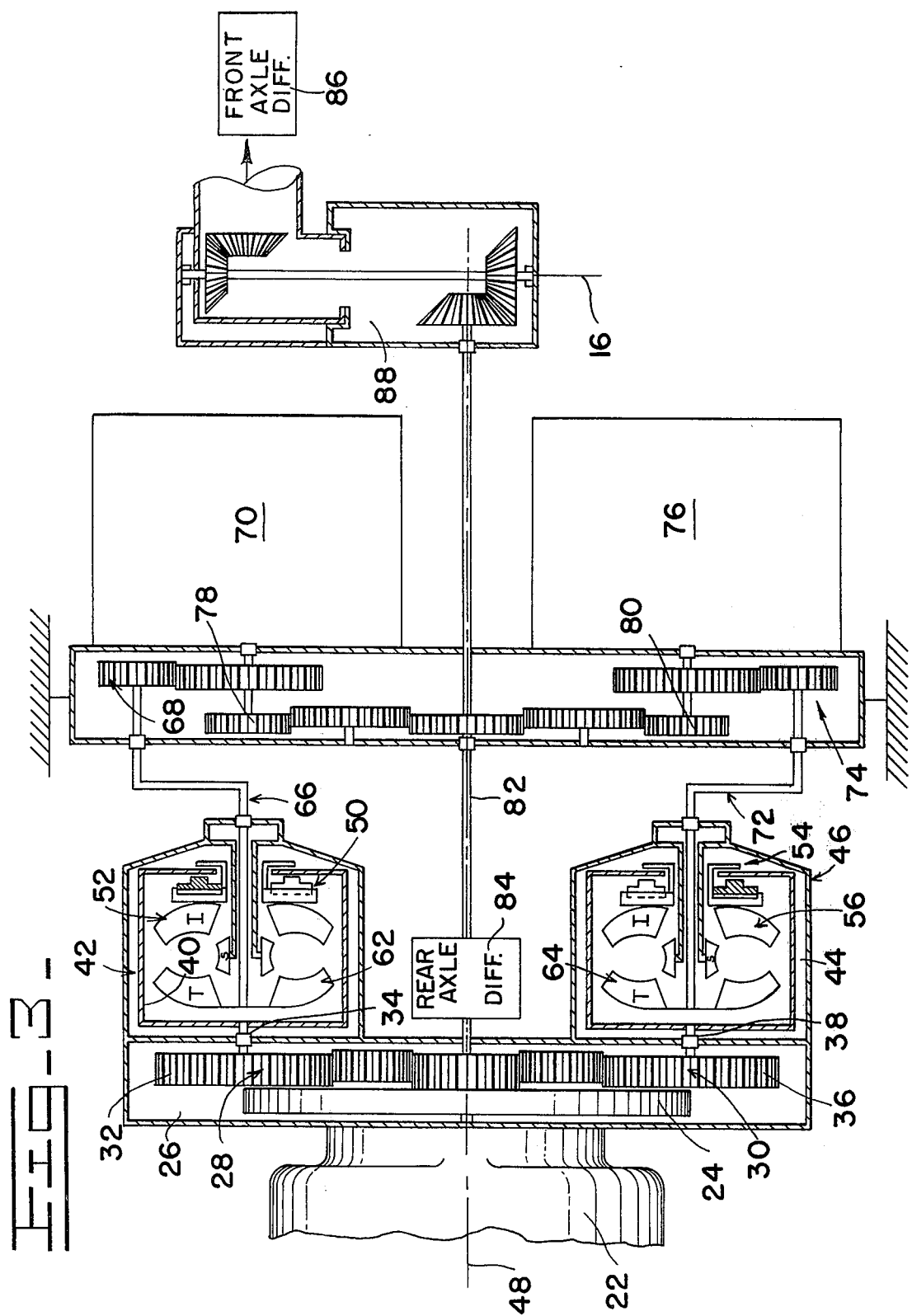

3,939,936

DUAL CONVERTER TRANSMISSION ARRANGEMENT

BACKGROUND OF THE INVENTION

This invention relates to drive apparatus for a vehicle, and more particularly, to such drive apparatus which incorporates a pair of torque converters used to drive the forward and rearward wheels of the vehicle.

In the prior art, it is well-known to provide in a vehicle first and second torque converters, the pump of each torque converter being driven by the engine of the vehicle, and the turbine of each converter being driven by rotation of the pump thereof. The turbines of such first and second converters drive respective first and second shafts, the rotation of which in turn drive the forward and rearward wheels of the vehicle. Such a system is disclosed in U.S. Pat. No. 3,455,407 to Phillips. While such a system has proved relatively effective in use, it will be understood that, in order to achieve certain drive characteristics, along with a high degree of simplicity and economy, other dual torque converter drive systems might with advantage be utilized.

SUMMARY OF THE INVENTION

It is accordingly an object of this invention to provide, in a vehicle, a drive system incorporating dual torque converters.

It is a further object of this invention to provide, in a vehicle, a vehicle drive system which, while fulfilling the above object, is extremely simple in design, and permits the use of relatively small dual drive train components, meanwhile being efficient in operation.

Broadly stated, the invention is in combination with a vehicle including forward and rearward means rotatable to drive the vehicle, and a motor including rotary output means. Such invention comprises first torque converter means connected to the rotary output means to be driven thereby, and second torque converter means connected to the rotary output means to be driven thereby. A shaft is rotatably supported relative to the vehicle and is connected to the forward and rearward means, so that rotation of such shaft rotates the forward and rearward means to drive the vehicle. Means drivingly connect the shaft and first torque converter means, and means drivingly connect the shaft and second torque converter means, so that the shaft is driven through the first and second torque converter means by the rotary output means.

BRIEF DESCRIPTION OF THE DRAWINGS

These and other objects of the invention will become apparent from a study of the following specification and drawings, in which:

FIG. 1 is a side elevation of a vehicle incorporating the invention.

FIG. 2 is a plan view of the inventive drive means of the vehicle; and

FIG. 3 is an enlarged plan view of a portion of the system of FIG. 2.

DESCRIPTION OF THE PREFERRED EMBODIMENT

Shown in FIG. 1 is a vehicle 10. The vehicle 10 is of the articulated type, and includes a forward portion 12 and a rearward portion 14. The forward and rearward portions 12,14 are pivotally connected by a joint 16, and are supported by respective forward and rearward vehicle wheels 18,20. Such wheels are of course rotatable, so that rotation thereof drives the vehicle 10.

The vehicle 10 includes a motor or engine 22 which has well-known rotary output means, including a flywheel 24. The flywheel 24 is drivingly connected with a transfer gear box 26 which includes two sets of output gear trains 28,30, the output gear train 28 having an output gear 32 which rotates an output shaft 34, and the output gear train 30 having an output gear 36 which rotates an output shaft 38. The gears of the transfer gear box 26 are chosen so that shafts 34,38 rotate faster than the flywheel 24.

The shaft 34 rotates the casing 40 of a torque converter 42, and the shaft 38 rotates the casing 44 of a second torque converter 46. Such torque converters 42,46 are spaced laterally of each other relative to the forward-rearward axis of the vehicle 10, and are positioned on either side of the general centerline 48 of the vehicle 10. A slipping modulating clutch 50 interconnects the casing 40 and the input means 52 of the torque converter 42, and a slipping modulating clutch 54 interconnects the rotary casing 44 and the input means 56 of the torque converter 46. Such individual slipping modulating clutches 50,54 are included so that engine torque may be controllably apportioned by centrifugal valves associated with such clutches 50,54 respectively to auxiliary fluid pumps 58,60 associated with the vehicle.

The torque converters 42,46 are supplied with fluid and controlled simultaneously from a single remote operator control (not shown). The input means 52 rotates output means 62 of the torque converter 42, and the input means 56 rotates output means 64 of the torque converter 46, as is well known. The output means 62 of the torque converter 42 rotates shaft means 66 which in turn rotates the input gear means 68 of a multi-speed transmission 70. The output means 64 of the torque converter 46 rotates shaft means 72 which in turn rotates the input gear means 74 of a second multi-speed transmission 76. The multi-speed transmissions 70,76 are spaced laterally of each other in side-by-side relation relative to the forward-rearward axis of the vehicle 10, and on either side of the general centerline 48 of the vehicle 10. These transmissions may with advantage take the form of that disclosed in U.S. Pat. No. 3,077,795 (assigned to the assignee of this invention).

The output gears 78,80 of the transmissions 70,76 are both connected to a shaft 82. Such shaft 82 is rotatably supported relative to the vehicle 10, and is directly connected to a differential 84 so that rotation thereof drives the rear wheels 20 of the vehicle 10.

Such shaft 82 is also drivingly connected to a differential 86 through a transfer box 88 which allows articulation of the vehicle 10, so that rotation of such shaft 82 rotates the wheels 18, so that the vehicle 10 is four-wheel-driven.

It will be seen that the torque converters 42,46 are disposed in parallel, and the shaft 82 is driven through both torque converters 42,46 by the rotary output means of the motor 22.

Such system as described herein eliminates the need for a single large power train which would include large components. The system as disclosed herein also provides relatively greater energy absorption in forward and reverse shifts, by dividing the energy absorption through a dual power train. The modulated clutch torque converters allow directional shifts at part throttle while for example lifting a loaded bucket which may be associated with the vehicle 10.

What is claimed is:

1. In combination with a vehicle including forward and rearward means rotatable to drive said vehicle, and a motor including rotary output means;

a first output gear train drivingly connected with said rotary output means;

a first output shaft rotated by the output gear of said first output gear train;

a second output gear train drivingly connected with said rotary output means;

a second output shaft rotated by the output gear of said second output gear train;

each output gear being independently driven through a respective one of said output gear trains to in turn drive a respective output shaft;

a first torque converter connected to said first output shaft to be driven thereby;

a second torque converter connected to said second output shaft to be driven thereby;

a third shaft rotatably supported relative to said vehicle and connected to the forward and rearward means, so that rotation of said third shaft rotates said forward and rearward means to drive said vehicle;

a first multi-speed transmission drivingly connecting said third shaft and first torque converter;

a second multi-speed transmission drivingly connecting said third shaft and second torque converter, so that said third shaft is driven through both said first and second torque converters by the rotary output means;

the first and second torque converters being spaced laterally of each other relative to the forward-rearward axis of the vehicle on either side of the centerline of the vehicle;

the first and second transmissions being spaced laterally of each other relative to the forward-rearward axis of the vehicle on either side of the centerline of the vehicle.

* * * * *